Figure 1:
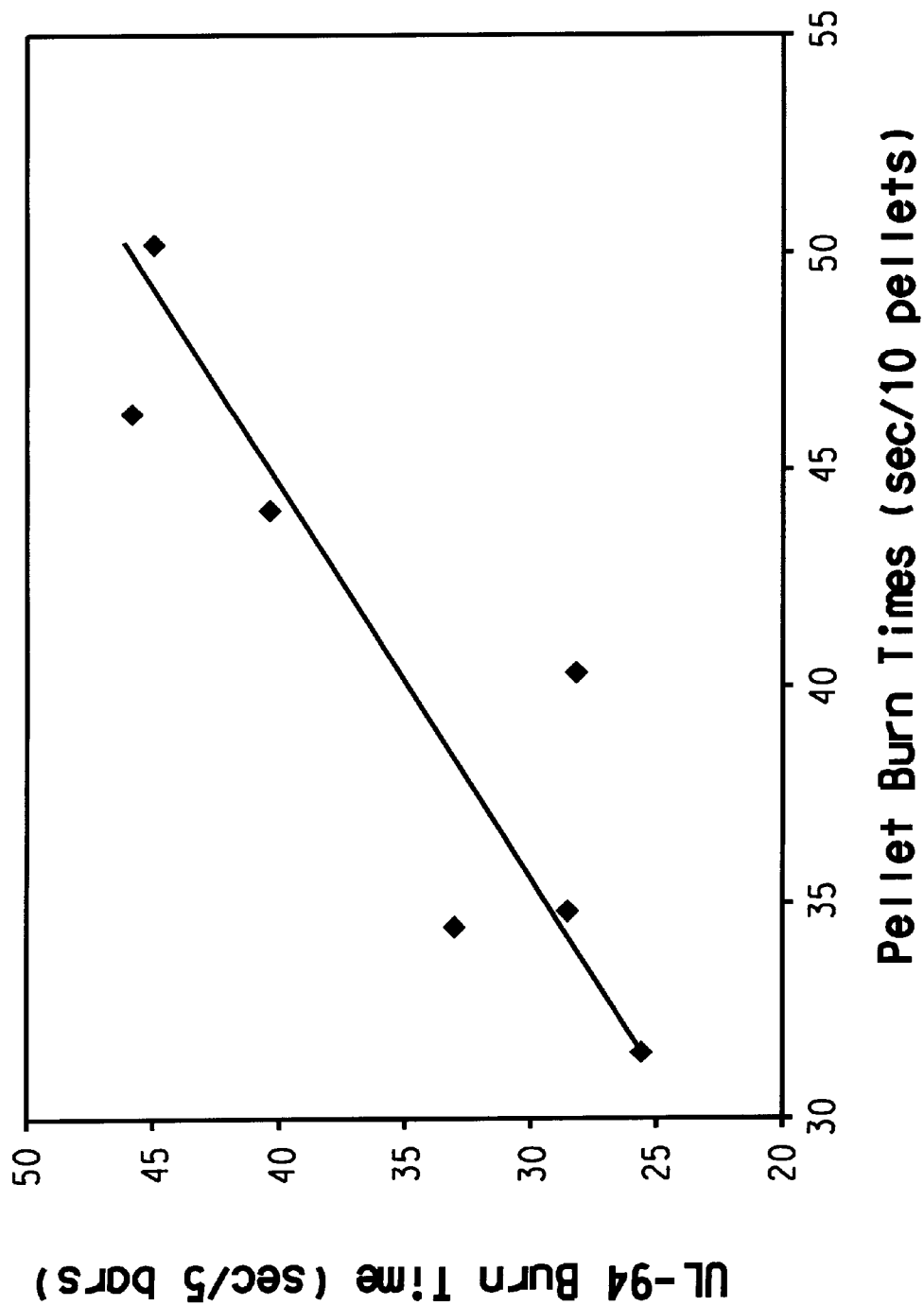

United States Patent [19]

Corbin et al.

[11] Patent Number: 6,126,856
[45] Date of Patent: Oct. 3, 2000

[54] COMPOSITION CONTAINING LIQUID CRYSTALLINE POLYMER

[75] Inventors: David Richard Corbin, West Chester, Pa.; Steven Gust Cottis, West Windsor, N.J.; Irene Greenwald Plotzker, Wilmington, Del.

[73] Assignee: E.I. DuPont de Nemours and Company, Wilmington, Del.

[21] Appl. No.: 09/331,075

[22] PCT Filed: Dec. 15, 1997

[86] PCT No.: PCT/US97/22905

§ 371 Date: Jun. 16, 1999

§ 102(e) Date: Jun. 16, 1999

[87] PCT Pub. No.: WO98/28380

PCT Pub. Date: Jul. 2, 1998

Related U.S. Application Data

[60] Provisional application No. 60/033,898, Dec. 20, 1996.

[51] Int. Cl.[7] .......................... C09K 19/52; C09K 21/14; C08K 3/34; C08K 67/00

[52] U.S. Cl. ................... 252/299.01; 252/601; 252/609; 523/521

[58] Field of Search ................ 252/299.01, 601, 252/609; 57/904; 264/300; 523/521; 524/789

[56] References Cited

U.S. PATENT DOCUMENTS 5,614,568  3/1997  Mawatari et al. ...................... 523/122

FOREIGN PATENT DOCUMENTS

| | | |
|---|---|---|
| 3-205436 | 9/1991 | Japan . |
| 6-57117 | 3/1994 | Japan . |
| 10-330606 | 12/1998 | Japan . |

*Primary Examiner*—Shean C. Wu

[57] ABSTRACT

When small amounts of zeolite or titanosilicates are added to thermotropic liquid crystalline aromatic polyester, poly(ester-amide) or poly(ester-imide) compositions, the compositions become less flammable. In many cases addition of the zeolite or titanosilicates does not significantly affect other properties of the composition, which may be used as molding resins, for instance to make parts useful in the electrical, electronic or automotive industry.

9 Claims, 1 Drawing Sheet

COMPOSITION CONTAINING LIQUID CRYSTALLINE POLYMER

This application claims benefit to U.S. provisional application, Ser. No. 60/033,898 filed Dec. 20, 1996.

FIELD OF THE INVENTION

This invention relates to compositions comprising liquid crystalline polymers.

TECHNICAL BACKGROUND

Liquid crystalline polymers (LCPSs) have become important items of commerce, being useful as molding resins and in films for general purpose use, and more specifically in the automotive, electrical and electronic industries. In many of these uses fire or flame retardence, or resistance of varying degrees, is required of the polymers. Methods to make polymers in general, and LCPs in particular, more flame retardant are constantly being sought. Such methods are especially valuable when they do not significantly degrade the other important properties of the LCP and/or create other problems, such as general more toxic smoke during exposure to fire.

Japanese Patent application Publication 6-57117, published Mar. 1, 1994 (Sumitomo Chemical Company) describes the use of zeolites as fillers in LCPs for reducing the amount of volatiles when the LCPs are heated. No mention is made of flame or fire retardance.

BRIEF REFERENCE TO THE DRAWING

FIG. 1 shows the pellet Burn Times of a set of LCP compositions containing various zeolites vs. the UL-94 burn times (after aging 7 days at 70° C.) for the same compositions.

This Figure illustrates that relative Pellet Burn Times are a good indicator if relative UL-94 burn times, and vica versa, for any given set of zeolite-containing LCP compositions.

SUMMARY OF THE INVENTION

This invention is a composition comprising a thermotropic liquid crystalline polymer which is an aromatic polyester, poly(ester-amide), poly(ester-imide), poly(ester-amide-imide), or mixtures thereof, and about 1.0–10 weight percent of an Inorganic Additive selected from zeolites and titanosilicates. The weight percent of the additive is based on weight of the thermotropic liquid crystalline polymer. The composition is characterized by the fact that at a polymer bar thickness of 0.79 mm, burn time is reduced by at least 15% when tested according to Underwriter's Laboratories test UL-94, the tested sample having been aged before testing for 7 days at 70° C. The preferred Inorganic additive is zeolite and the preferred thermotropic liquid crystalline polymer is an aromatic polyester.

Preferred zeolites are 4A, 13X or NaP. Preferred zeolites are aluminosilicates having a Si/Al molar ration of 250 or less, more preferred 30 or less, even more preferred 10 or less, and most preferred 5 or less.

the compositions have a rating of V-0 in test UL-94. The composition's burn time is reduced by at least 30% or more. The flexural strength of the composition is at least 95% of the said thermotropic liquid crystalline polymer.

The weight percent zeolite based on the weight of said thermoplastic liquid crystalline polymer is preferably about 2.0–8.0 weight percent, more preferably about 2.0–5 weight percent.

DETAILS OF THE INVENTION

By an LCP is meant a polymer that is anisotropic when tested in the Thermo-Optical Test ("TOT") described in U.S. Pat. No. 4,118,372. By "thermotropic" is meant that the polymer may be melted and then resolidified, i.e. is thermoplastic. By "aromatic" is meant that, except for the carbon atoms contained in functional groups such as ester amide or imide, all of the carbon atoms in the main chain of the polymer are present in aromatic rings such as phenylene, naphthylylene, biphenylene, etc. Carbon atoms in other types of groupings such as alkyl may be present as substituents on the aromatic rings, as in a repeat unit derived from methylhydroquinone or 2-t-butyl-4-hydrozybenzoic acid, and/or also present at other places in the polymer such as in N-alkyl amides. Other substituent groups such as halogen, ether, and aryl may also be present in the LCP.

the LCPs useful in this invention include polyester, poly (ester-amides), poly(ester-imides) and poly(ester-amide-imides) and mixtures thereof. These terms have their usual meaning, and simply indicate that the repeat units in the polymer are joined by ester and optionally amide and/or imide linkages. LCPs are well-known in the art, see for instance U.S. Pat. Nos. 3,991,013, 3,991,014, 4,011,199, 4,048,148, 4,075,262, 4,083,829, 4,118,372, 4,122,070, 4,130,545, 4,153,779, 4,159,365, 4,161,470. 4,169,933, 4,184,996, 4,189,549, 4,219,461, 4,232,143, 4,232,144, 4,245,082, 4,256,624, 4,269,965, 4,272,625, 4,370,466, 4,383,105, 4,447,592, 4,522,974, 4,617,369, 4,664,972, 4,684,712, 4,727,129, 4,727,131, 4,728,714, 4,749,769, 4,762,907, 4,778,927, 4,816,555, 4,848,499, 4,851,496, 4,851,497, 4,857,626, 4,864,013, 4,868,278, 4,882,410, 4,923,947 4,999,416, 5,015,721, 5,015,722, 5,025,082, 5,086,158, 5,102,935, 5,110,896, and 5,143,956, and European Patent Application 356,226 for descriptions of typical polymers useful in this invention. These patents also described methods of making these types of polymers. A preferred LCP is an aromatic polyester.

Another ingredient in the composition is a natural or synthetic zeolite or a titanosilicate, which are inorganic molecular sieves. Inorganic molecular sieves are well known in the art and are described in R. Szostak, Molecular Sieves-Principles of Synthesis and Identification, van Nostrand Reinhold, (1989), p. 2. Inorganic molecular sieves include aliminosilicates, which are sometimes called "zeolites", and titanosilicates, and other types of inorganic compounds. Zeolites are preferred inorganic molecular sieves generally.

The term "Inorganic Additive" will be used hereafter to refer to zeolites and titansilicates.

Any Inorganic Additive that is effective in increasing the flame retardance of an LCP is useful herein. It is impossible to predict which zeolites or titanosilicates, or even which samples thereof will be so useful, but simple tests to determine this, requiring little experimental effort, have been developed. For instance, the Examples and Comparative Examples herein describe experiments in which differing results are obtained from what are formally the same Inorganic Additive. Compare for instance Examples 2 and 3, and 20 and 22. It is not known what factors cause some Inorganic Additives to be useful, and others not useful or to have differing degrees of effectiveness in this invention.

Inorganic Additives may be readily tested by either of two tests (both described in detail below). The Underwriter's Laboratory UL-94 test (dated Jan. 28, 1980) gives the more precise data, but the pellet burn test described below may be used as a screening test for flame retardance, and is somewhat easier and quicker to use than the UL-94 test. As shown in FIG. 1, the results of the pellet burn tend to parallel the results obtained in the UL-94 test.

Some useful Inorganic Additives are mentioned in the Examples, and include (the following nomenclature is accepted in the zeolite art to refer to specific types of zeolites) 4A, 13X, NaY. NaP, ABSCENT° 3000, Na-ZSM-5, Chabazite and Na Mordentie. Preferred zeolites are 4A, 13X, and NaP. some Inorganic Additives may only be effective at higher concentrations in the LCP. It is preferred that the amount of Inorganic Additive present is about 1.0 to about 10 weight percent, more preferably about 2.0 to 8.0 weight percent, most preferably about 2.0 to 5.0 weight percent, based on the weight of the thermotropic liquid crystalline polymer. It is also preferred that the Inorganic Additive be a zeolite, and that it has Si/Al molar ration of 250 or less, more preferably 30 or less, even more preferably 10 or less, and most preferably 5 or less.

The UL-94 test is a burn test run on polymer bars. Among other things, the tester records how long the total burning time is for a set of 5 bars. Depending on this total burning time, and other factors such as any dripping, the polymer is given a rating as defined by the test procedure. A sample is said to "drip" in the test when some molten resin falls off the bar. If the drip is burning, and it burns enough to ignite a cotton ball located beneath the bar, the material fails the test. Even self-extinguishing drips, which technically do not cause the material to fail the test, are considered undesirable in practice. The best rating (polymer the least flammable) is V-0 in UL-94. It is preferred that any of the Inorganic Additive containing LCPs have this rating, no matter what the thickness of the bars, with thinner bars usually giving longer burning times. Unless otherwise specified herein, the thickness of the bars is 0.79 mm (1/32 inch) thick.

Burn times for LCP bars containing the Inorganic Additive should be at least about 15% less than for the same LCP bars which do not contain Inorganic Additive. The bars should be prepared by the same methods from the same materials as much as possible. This percentage difference in the burn times is calculated as follows:

$$\% \text{ difference} = \frac{-(BT_z - BT_c) \times 100}{BT_c}$$

wherein $BT_z$ is the sum of burn times in seconds for at least 5 LCP containing the zeolite, and $BT_c$ is the sum of burn times in seconds for the same number of LCP (control) bars not containing the Inorganic Additive. In order to have a burn time fo about 15% or less, the result of the above equation should be about 15% or more [note the difference in the sign (+/−) of the number desired]. It is preferred that this percent difference is about 20% or more, more preferably about 30% or more.

Other ingredients usually found mixed with LCPs may also be present in the Inorganic Additive containing LCPs. These include fillers such as clay or talc, reinforcing agents such as glass fiber, tougheners, other polymers, pigments such as $TiO_2$ or carbon black, dyes, antioxidants, lubricants such as polyethylene wax, etc. However, the amount of Inorganic Additive present is based solely on the percent by weight of the LCP present. These compositions including the Inorganic Additive may be made by methods known in the art. Probably the most common mixing method is melt blending of the LCP (an any other polymers present) with the other ingredients, such as may be done in a single or twin screw extruder. Before mixing the Inorganic Additive with the LCP it is preferred (especially with Inorganic Additives that contain water that can be removed by heating) that the Inorganic Additive be dried at least at the temperature at which it will be melt mixed with the LCP, and preferably higher (see INORGANIC ADDITIVE DRYING, below).

As mentioned above, it is preferred that the Inorganic Additive does not degrade any of the other properties of the LCP material. For instance, it is preferred that the flexural strength of the LCP composition with Inorganic Additive not be more than 10% less, more preferably not less than 5% less, than the flexural strength of the LCP composition without Inorganic Additive. This may be calculated as follows:

$$\% \text{ difference} = \frac{-(FS_z - FS_c) \times 100}{FS_c}$$

wherein $FS_x$ is the flexural strength of the LCP composition containing the Inorganic Additive, and $FS_c$ is the flexural strength of the LCP (control) composition not containing the Inorganic Additive.

It has also been surprisingly found that when many of these Inorganic Additives are added to a thermotropic liquid crystalline polymer composition, the melt viscosity at a given shear rate decreases significantly. In general such decreases in viscosity often infer a decrease in polymer molecular weight, which in turn is often accompanied by a decrease in physical properties such as tensile and flexural strength and elongation. This is not the case however when Inorganic Additives are added, indicating the LCP molecular weights may not be lowered. It was also found that Inorganic Additives may have the ability to reduce or stop dripping of samples, made with low viscosity materials, during the UL-94 burn test.

In a preferred LCP composition the melt viscosity, when measured at a shear rate of 1000 $sec^{-1}$ using a Galaxy® V, Model 8052 capillary rheometer made by Kayeness, Inc., at an appropriate temperature, is lowered by 20 percent, more preferably 40% when compared to a similar composition without Inorganic Additive. The calculation of the percent decrease in viscosity is carried out in a similar manner to calculation of decrease in burn time, above, In other Inorganic Additive-containing composition it is also preferred that the flexural strength of the LCP composition with Inorganic Additive not be more than 10% less, more preferably not less than 5% less, than the flexural strength of the LCP composition without Inorganic Additive, when measured and calculated as described above.

SOURCES OF INORGANIC ADDITIVES

TABLE 1

| Ex. No. | Inorganic Additive | Vendor Name | SI/AI (moles) | Source | Lot No. |
|---|---|---|---|---|---|
| 1 | — | ABSCENTS 3000 | ≧200 | UOP, Des Plaines, IL 60017 USA | — |
| 2 | NaX | 13X | 1.25 | Aldrich Chemical Co., Milwaukee, WI 53233 USA | 01820CY |
| 3 | NaX | 13X (UOP 9356) | 1.25 | UOP | 92-2-570A |
| 4 | NaY | LZY52 | 2.46 | Alfa Chemicals, Danvers, MA 01923 | 111885 |
| 5 | Calcined $NH_4$-ZSM-5 | SM55 | ~27.5 | ALSI-PENTA Zeolithe GmbH, D-92407 Schwandorf, Germany | — |
| 6 | NaA (4A) | VALFOR 100 | 1 | The PQ Corp., Valley Forge, PA 19482 USA | — |
| 7 | NaX | 13X | 1.25 | Aldrich Chemical Co. | 01820CY |
| 8 | ETS-4 | — | —* | Engelhard Chemical Co., Iselin, NJ 08830 USA | 16760-4 |
| 9 | ETS-10 | — | —* | Engelhard Chemical Co. | 16760-18 |
| 10 | Calcined $NH_4$-Mordenite | 30A | 17.5 | The PQ Corp., | 30A-HM-6 |
| 11 | $Na_2$K-Ferrierite | EZ-500 | 8.5 | Engelhard Chemical Co. | 29835 |
| 12 | Na-ZSM-5 | SN55 | ~27.5 | ALSI-PENTA Zeolithe GmbH | — |
| 13 | NaA (4A) | Zeolite A | 1 | The PQ Corp. | 1621-58-A |
| 14 | NaP | — | 1 | The PQ Corp. | 1643-70-P |
| 15 | — | ABSCENTS 3000 | ≧200 | UOP | 04815-PP |
| 16 | — | ABSCENTS 3000 | ≧200 | UOP | 04815-PP |
| 17 | NaX | 13X | 1.25 | UOP | — |
| 18 | — | ABSCENTS 3000 | ≧200 | UOP | 04815-PP |
| 19 | NaX | 13X | 1.25 | UOP | — |
| 20 | NaA (4A) | VALFOR 100 | 1 | The PQ Corp. | — |
| 21 | NaA (4A) | VALFOR 100 | 1 | The PQ Corp. | — |
| 22 | NaA (4A) | EZA | 1 | Albemaric, Baton Rouge, LA | — |

*titanosilicates

PELLET BURN TEST

A pellet is held in the flame of a conventional disposable butane-fueled Bic® cigarette lighter for 10 seconds. The flame size is adjusted to approximately 1.5 cm. The pellet is held in the midst of the yellow tip of the flame in a hand-held "pincer" for example tongs. The pellet is typically a cylinder of about 0.32 cm diameter and about 0.32 cm long. The flame is then removed, and while being held in the pincers the time the pellet continues to burn is recorded. This is repeated for a total of 10 pellets, with the burn time reported as either a mean (seconds/pellet) or sum of individual times (seconds/10 pellets). A correlation of pellet burn time with UL-94 burn time for 0.079 cm (1/32') thick bars of LCP compositions conditioned 7 days at 70° C. is shown in FIG. 1, with a correlation coefficient, $r^2$, of 0.79.

COMPOUNDING OF THE SAMPLES AND MOLDING TEST BARS

Compounding of the resins in the Examples below was done using a 30 mm or 40 mm Werner and Pfleiderer or a 16 mm Prism twin-screw extruder with conventional conveying elements, kneading or mixing elements, a low-pressure zone with venting under vacuum of any volatiles from the polymer met, and a die. As the compounded LCP compositions exited the die, they were quenched with water (spray or short quench tank) and cut into pellets with a conventional strand cutter. The extruder barrel and die were maintained at 300° C. in the case of the 16 mm extruder, or 20° C. to 335° C. when the 30 mm or 40 mm extruder was used.

Prior to extrusion or molding, LCP resin pellets were dried overnight for approximately 16 hours in a vacuum oven with nitrogen purge at 100° –135° C. Dried, compounded LCP resins were molded into standard test bars, as required per ASTM D638 for determining tensile properties an D ASTM D790 for flexural properties, on a 6 oz, (170g) HPM injection molding machine with barrel temperatures of 290° C. to 320° C. and injection pressures of about 40 to about 70 MPa.

DRYING OF INORGANIC ADDITIVE

Inorganic Additives were dried prior to extrusion or by the manufacturer. When dried the Inorganic Additives were heated at 1° C./min to 450° C., held at 450°C. for 10 min, then heated to 500° C. at 1° C. min, held at 500° C. for 10 min, the heated at 1° C./min to 550° C. for 5 h. The Inorganic Additives were then cooled at 5° C./min to 110° C., and bottled at his temperature to minimize rehydration prior to extrusion.

EXAMPLES

In the Examples, and for physical testing values given herein, the following procedures were used:
Tensile Strength & Elongation—ASTM D-638
Flexural Modulus and Strength—ASTM D-790
DTUL (Heat Deflection Temperature)—ASTM D-648
Notched Izod—ASTM D-256
Melt viscosities of dried samples were determined at the noted temperature and shear rate using a Galaxy®V, Model 8052 capillary rheometer made by Kayeness, Inc.

In ASTM D-638, to accurately determine elongation to break, strain gauges were used.

EXAMPLES 1–6 AND COMPARATIVE EXAMPLE A

A 5 weight percent TiO$_2$ (Unitane® O-220) pigmented, 30 weight percent glass fiber reinforced LCP composition was used, the LCP polymer has the same composition as that of Example 4 of U.S. Pat. No. 5,100,896 (hydroquinone;4,4'-biphenol/terephthlatic acid/2,6-naphthalene decarbozylic acid/4hydroxy-benzoic acid in molar ration 50/50/70.30/320). The composition was extruded by itself (Example A) and with 5 wt % of a zeolite additive, which is identified shown in Table 1. The zeolite weight was 8.1% of the weight of the LCP polymer Burn test results on the extruded pellets are shown in Table 2.

TABLE 2

| Example No. | Burn Time (s/10 pel) |
| --- | --- |
| A | 34.9 |
| 1 | 23.7 |
| 2 | 27.6 |
| 3 | 18.0 |
| 4 | 27.7 |
| 5 | 29.9 |
| 6 | 20.4 |

EXAMPLES 7–13 AND COMPARATIVE EXAMPLE B

The same LCP as used Examples 1–6 was extruded by itself and with 5 wt % of the additive identified in Table 1 (weight of Additive was 8.1% of weight of LCP polymer). burn test results on the extruded pellets are shown in Table 3.

TABLE 3

| Example No. | Burn Time (s/10 pel) |
| --- | --- |
| B | 38.4 |
| 7 | 25.4 |
| 8 | 34.8 |
| 9 | 32.6 |
| 10 | 33.2 |
| 11 | 22.8 |
| 12 | 20.4 |
| 13 | 17.9 |

EXAMPLE 14

The LCP of Examples 1–6 was used, as part of 30% glass fiber reinforced, lubricated, white-pigmented product prepared by extrusion compounding, Two additional resins were prepared, differing only in that one contained 1.5% NaP zeolite and the other, 2.5% NaP zeolite (2.37% and 4% by weight NaP zeolite, respectively, based on LCP present). Pellet burn times were 42.8 sec/10 pellets for the resin containing no NaP zeolite, 35.5 sec/10 pellets for the resin containing the 1.5% NaP zeolite, and 25.4 sec/10 pellets for the resin containing 2.5% of the NnaP zeolite.

EXAMPLE 15

Vetra®L130, a 30% glass-reinforced PCP manufactured by Hoechst-Celanes, was dried and molded into bars 0.79 mm (1/32') thick for UL=94 test. There was 7.52 wt % zeolite based on resin. The LCP is believed to be biphenol/terephthalic acid/p-hydroxybenzoic acid /6-hydroyz-2-naphthoic acid in molar arations 100/100/404- 575/X. Compositions of the samples and UL-94 results are shown in Table 4. While extrusion alone was effective in lowering the burn times, a large fraction of bars dripped. The zeolite addition increased flow (lowered melt viscosity) and lowered burn times while inducing no dripping.

TABLE 4

| Description | Melt Viscosity (Pa · s at 320° C., 1000/s shear rate) | UL94 Burn Times: 48 h, 23° C./ 7 d, 70° C. (sec) | Number of drips: 48 h, 23° C./ 7 d, 70° C. (maximum: 5) |
| --- | --- | --- | --- |
| Dried, molded | 65 | 32.2/28.6 | 0/0 |
| Extruded, dried, molded | 32 | 21.6/13.6 | 2/5 |
| Extruded with 5 wt % ABSCENTS 3000, dried, molded | 41 | 25.5/21.6 | 0/0 |

EXAMPLE 16

An LCP having repeat units derived from hydroquinone/terephthalic acid/isophthalic acid/2,6- naphthalen dicarboxylic acid/4-hydroxybenzoic acid in the molar ratio of 100/25/50/25/300, respectively, was compounded with glass fiber, polyethylene wax, and a TiO$_2$ concentrate in the respective proportions 61.5/32/5/6/0.2 by weight (Sample A). A second resin, contained the same ingredients plus ABSCENTS 3000 zeolite in the respective proportions 61.5/30/6/0.2/2.5 (4.06% by weight zeolite based on LCP). Pellets were dried and molded into bars for tests (Sample B). Melt viscosity was measured on dried pellets. Properties are shown in Table 5. The resin containing the zeolite had a UL-94 rating of V-0 at 016. cm (1/16') and V-1 at 0.079 cm (1/32') thicknesses, versus V-1 at both thicknesses for Sample A. Addition of the zeolite also increased flow (decreased melt viscosity) and while maintaining mechanical and thermal properties.

TABLE 5

| Sample | A | B |
| --- | --- | --- |
| ABSCENTS 3000 (wt %) | 0 | 2.5 |
| Melt Viscosity (Pa · s, temp, 1000/s) | 67 | 48 |
| Tensile Strength (MPa) | 152 | 147 |
| Tensile Elongation at Break (%) | 1.87 | 1.91 |
| Flexural Strength (MPa) | 192 | 187 |
| Flexural Modulus (GPa) | 14.8 | 14.1 |
| DTUL (° C. @ 1.82 MPa) | 227 | 231 |
| Notched Izod impact strength | 77.4 | 65.7 |
| UL94, 1/32"[a] | 49.6 V0/68.0 V1 | 41.4 V0/59.7 V1 |
| UL94, 1/16"[a] | 50.3 V1, 1 long burn/25.8 V0 | 25.4 V0/29.5 V0 |

[a]The first value for the UL-94 results is after aging 48 h at 25° C. at 50% relative humidity, while the second value is after aging 7 days at 70° C.

EXAMPLE 17

A polymer which had the same composition as that of Examples 1–6 hereof was extrusion compound with TiO$_2$, white talc, and chopped glass fiber. The $TiO_2$ was added in the form of a 40% concentrate in the LCP, so that 8 parts by weight of concentrate is equivalent to 3.2 parts by weight of $TiO_2$. The composition in parts by weight was 52/8/30/10 (LCP/$TiO_2$ concentrate /white talc/glass fiber). A second LCP resin was compounded containing, in place of the 8 parts by weight of 40% $TiO_2$ concentrate, 8 parts by weight of a concentrate that was 20% $TiO_2$ and 20% 13X zeolite (2.8 wt % zeolite based on LCP). The pellets of both filled LCP resins were dried and molded into bars for tests. Melt viscosity was measured on dried pellets. Results are shown in Table 6 The resin containing the zeolite showed improved flow (lower melt viscosity) and lower burn times while maintaining mechanical and thermal properties.

TABLE 6

| | | |
|---|---|---|
| 13X zeolite (wt %) | 0 | 1.6 |
| Melt Viscosity (Pa · s), 350° C., 1000/s) | 98 | 41 |
| Tensile Strength (MPa) | 111 | 105 |
| Elongation at Break (%) | 3.07 | 2.76 |
| Flexural Strength (MPa) | 144 | 145 |
| Flexural Modulus (GPa) | 10.1 | 10.1 |
| DTUL (° C. @ 1.82 MPa) | 271 | 269 |
| Notched Izod impact strength (Nm/m) | 121 | 190 |
| UL94, 1/32"[a] | 103.1 V2/272.4 V1 | — |
| UL94, 1/16"[a] | 56.3 V1/43.4 V0 | 28.0 V0/22.6 V0 |

[a]The first value for the UL-94 results is after aging 48 h at 25° C. at 50% relative humidity, while the second value is after aging 7 days at 70° C.

EXAMPLE 18–23 AND COMPARATIVE EXAMPLE C

An LCP composition similar to that used in Examples 1–6 was used, except it also contained a small amount of polyethylene wax lubricant (Example C). Five additional LCP resins were similarly prepared, but containing up to 2.5 wt % zeolite as identified in Table 1, with amounts shown in Table 7. Weight percent zeolite, based on LCP, were, for Examples 18–20 and 22, 3.97%, for Example 21, 2.32% and for Example C, 0%.

TABLE 7

| | Example No. | | | | | |
|---|---|---|---|---|---|---|
| | C | 18 | 19 | 20 | 21 | 22 |
| Zeolite Content | 0 | 2.5% | 2.5% | 2.5% | 1.25% | 2.5% |
| Melt Viscosity (Pa · s, temp ° C., 1000/s) | 58 | 40 | 22 | 20 | 29 | 46 |
| Tensile Strength (MPa) | 134 | 134 | 136 | 115 | 117 | 114 |
| Elongation at Break (%) | 2.94 | 3.22 | 3.28 | 2.59 | 2.65 | 2.30 |
| Flexural Strength (MPa) | 157 | 154 | 157 | 149 | 160 | 162 |
| Flexural Modulus (GPa) | 10.5 | 10.4 | 10.3 | 10.4 | 11.7 | 12.4 |
| Notched Izod impact strength (N · m/m) | 161 | 209 | 197 | 169 | 120 | 75 |
| UL94, 0.79 mm thick[a] | 34.2 V0/ 35.5 V0 | 24.7 V0/ 20.0 V0 | 16.3 V0/ 18.7 V0 | 14.6 V0/ 16.0 V0 | 18.9 V0/ 21.7 V0 | 21.1 V0/ 41.0 V0 |

[a]The first value for the UL-94 results is after aging 48 h at 25° C. at 50% relative humidity, while the second value is after aging 7 days at 70° C.

What is claimed is:

1. A composition comprising:
   a) a thermotropic liquid crystalline polymer which is an aromatic polyester, poly(ester-amide), poly(ester-imide), poly(ester-amide-imide), or mixtures thereof, and
   b) 1.0–10 weight percent of an inorganic additive selected from zeolites and titanosilicates, said weight percent of said additive being based on weight of said thermotropic liquid crystalline polymer,
   wherein:
      i) when prepared into a polymer bar thickness of 0.79 mm, burn time of said polymer bar is reduced by at least 15% when tested according to Underwriter's Laboratories test UL-94, the tested sample having been aged before testing for 7 days at 70° C., and
      ii) when said inorganic additive is a zeolite, said zeolite has a Si/Al molar ratio of 5 or less, and said composition has a flexural strength of at least 905 of the flexural strength of said thermotropic liquid crystalline polymer in the absence of said inorganic additive zeolite having a Si/Al molar ratio of 5 or less.

2. The compostion of claim 1 wherein said inorganic additive is zeolite having a Si/Al molar ration of 5 or less.

3. The compositon of claim 1 which has a rating of v-O in test UL-94.

4. The compositon of claim 1 wherein said UL-94 burn time is reduced by at least 30% or more.

5. The composition of claim 2 comprising 2.0–8.0 weight percent zeolite based on the weight of said thermoplastic liquid crystalline polymer.

6. The composition of claim 5 comprising 2.0–5 weight percent zeolite based on the weight of said thermoplastic liquid crystalline polymer.

7. The composition of claim 1 wherein said thermotropic liquid crystalline polymer is an aromatic polyester.

8. An article produced from the composition of claim 1.

9. A method for making wholly aromatic polyester resin composition with excellent flame retardant characteristics, which comprises the steps:

a) preparing a thermotropic liquid crystalline polymer which is an aromatic polyester poly(ester-amide), poly(ester-imide), poly(ester-amide-imide), or mixtures thereof, and b) melt blending the thermotropic liquid crystalline polymer produced in step a) with 1.0–10 weight percent of an inorganic additive selected from zeolites and titanosilicates, said weight percent of said additive being based on weight of said thermotropic liquid crystalline polymer, wherein:

i) when prepared into a polymer bar thickness of 0.79 mm, burn time of said polymer bar is reduced by at least 15% less than for the same liquid crystalline polymer bar which does not contain inorgainc additive when tested according to Underwriter's Laboratories test UL-94, the tested sample having been aged before testing for 7 days at 70° C., and ii) when said inorganic additive is a zeolite, said zeolite has a Si/Al molar ratio of 5 or less, and said composition has a flexural strength of at least 90% of the flexural strength of said thermotropic liquid crystalline polymer in the absence of said inorganic additive zeolite having a Si/Al molar ratio of 5 or less.

* * * * *